United States Patent Office 3,239,066
Patented Mar. 8, 1966

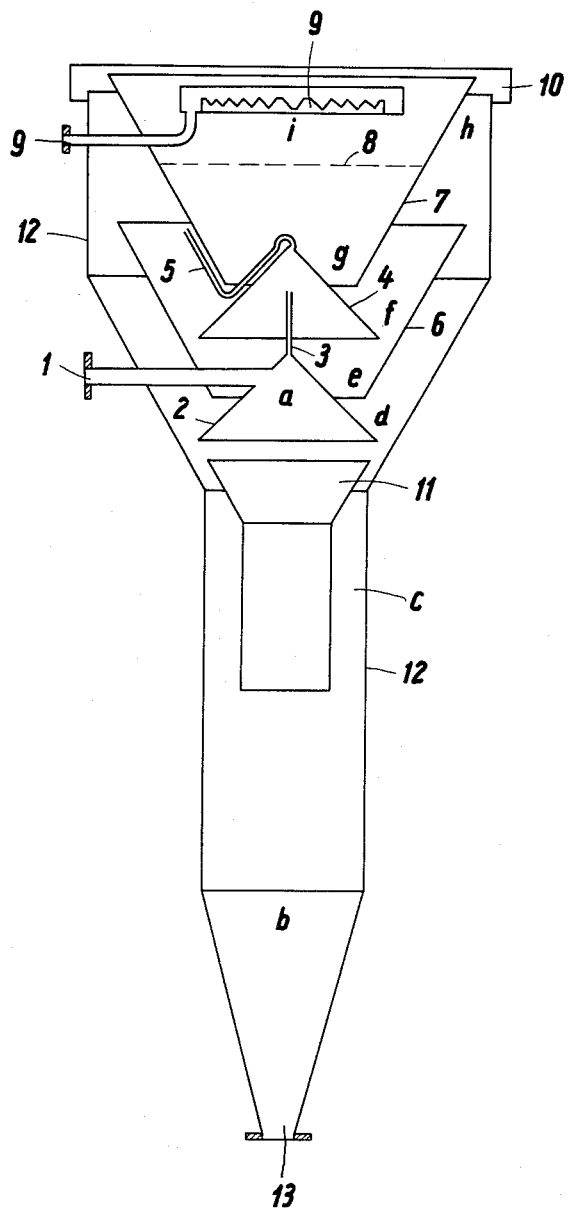

3,239,066
APPARATUS FOR SETTLING SOLID-CONTAINING LIQUIDS
Josef Schick, Siegen, Germany, assignor to Siegener Aktiengesellschaft für Eisenkonstruktion, Brückenbau und Verzinkerei, Klafeld-Geisweid, Kreis Siegen, Germany, a corporation of Germany
Filed Nov. 9, 1962, Ser. No. 236,741
Claims priority, application Germany, Nov. 9, 1961, S 76,625
3 Claims. (Cl. 210—519)

This invention relates to an apparatus for settling solid-containing liquids.

In sewage purification it is known to add agglomerating or flocculation agents to the sewage to be clarified, and to introduce the resultant liquid sludge into a settling basin, in which the solid particles separate from the water after a certain period, because of their higher specific gravity. This separation process is generally assisted mechanically in some way, for example by agitation.

The disadvantages of these known processes and of the apparatus developed for the performance thereof are, in particular, that the settled sludge is in contact with the water above it over a large area so that the settled solids are repeatedly whirled up and remixed with the water as a result of the inevitable movement of the latter. Consequently, with the known methods and apparatus, a considerable period of time is required for separation of the water from the solids and the consequence of this in turn is plant occupying a large area and accordingly high installation costs.

Finally, further disadvantages are due to the fact that with the known plants it was hardly possible to separate solids of the kind having a lower specific gravity than water and hence floating on the top of the water; in particular, the solids settling in the settling tank were only inadequately thickened and still had a very high water content.

In the present apparatus, in which the solid-containing liquid is introduced into a settling tank from which the purified liquid is withdrawn at the top end while the settled solids are withdrawn at the base, the above disadvantages are obviated according to the invention by adding flocculation agents known per se to the sludge just before the latter enters the central portion of the settling tank at a time such that flocculation of the solids takes place in the settling tank, and the liquid then rising in the settling tank has a continually increasing volume available while the solid flakes drop into a relatively narrow portion of the vessel of considerable height with a constant cross-section, in which they increasingly thicken as a result of their own weight. It has been found that flocculation of the solids inside the settling tank gives an extremely effective separation and favourable guidance of the solids, and that the solids then increasingly thicken in the high, for example tubular, bottom portion of the tank as a result of their own weight, and because of the relatively narrow cross-section of the bottom portion of the tank there is no fresh mixing of the solids with the water thereabove, because the contact area is only small.

Since the volume available to the ascending liquid is increasingly enlarged in the upward direction, the water is made increasingly calm, any remaining solids becoming easily separated from the water.

The latter advantage is enhanced by the fact that the rising liquid is preferably deflected in such manner that floatable solids can separate and entrained solid flakes can settle, while the solid flakes settling in the bottom narrow part of the tank are guided separately from the rising liquid separated in that zone. The still floatable solids are generally returned to the sludge inlet.

The quantity of liquid passing through the settling tank is preferably controlled by the degree of turbidity of the outgoing liquid, while the rate of discharge of the settled solids is controlled by the height of the level of solids in the narrow portion of the tank.

The settling tank has a top portion in which the separation of the liquid and water takes place, the top end being provided with an outlet for the clarified liquid, with a part situated therebeneath for collecting the solids, an outlet for the solids being provided at the bottom end of said part, and has an inlet for the sludge, and according to the invention this tank is characterised in that by the installation of known guide cones and cone-trays arranged the other way round in the top portion of the vessel there is an increase in the upward direction of the volume through which flows the liquid entering through the inlet disposed near the bottom end of the top part of the tank, and that the part of the tank for collecting the solids is of narrow and tall construction in relation to the top part and has a constant cross-section over its height.

In order that the rising liquid may preferably be deflected in the top part of the tank, the trays and the guide cones are preferably disposed alternately one above the other in such manner as to form between them annular passages of alternately larger and smaller diameters. A guide cone projecting from above into the part of the tank for collecting the solids is provided for the separate guidance of the solid flakes settling in the narrow bottom part of the tank from the liquid which rises in that zone.

One preferred exemplified embodiment of the settling tank according to the invention is illustrated in the drawing.

Turbid sewage to which settling and flocculation agents have been added just before entry, flows through the inlet 1 in the central part of the settling tank 12. The sludge flows to the top part of the flocculation chamber a. Sludge flakes form here and sink into the sludge guide cone 11 and then settle in the bottom b of the lower part of the settling tank, where they form a solid sludge. Between the sludge guide cone 11 and the outer wall of the lower part of the settling tank 12 there is an intermediate space c in which the water displaced by the settling sludge can flow to the top part of the settling tank without the upwardly flowing water flowing against the settling flakes and entraining the latter in the upward direction. Those flakes which nevertheless rise to the top part of the tank with the rising water flow into the chambers d, e, f, and g as a result of the provision according to the invention of the internal fittings and the shape of the housing wall according to the invention, in which chambers they can settle as a result of the deflection of the water due to the different diameters of the annular passages formed between the trays 2 and 4 and the guide cones 6 and 7. Floatable sludge constituents are deflected by the outer surfaces of the cones 6 and 7 into the chamber h and the floating sludge collecting on the surface of the water is periodically discharged through the overflow 10 or is re-added to the sludge entering at 1.

As a result of the arrangement of internal fittings according to the invention in the settling tank, the sewage has available from the inlet 1 to the overflow 9 an area which continuously increases so that there is an increasing calming of the water. This calming can be assisted by the use of one or more perforated plates denoted by reference 8 in the drawing. Above the calming plate 8 the clarified water in the chamber i is discharged through the overflow 9. Pipe lines 3 and 5 are used for venting the trays 2 and 4.

From the illustration of the settling tank according to the invention it will be seen that the bottom part of the apparatus is of long or tall and narrow construction in comparison with the compact top part. This results in effective settling with extensive de-watering of the sediment. The thickened sludge is discharged at the sludge outlet 13. With the apparatus according to the invention care must be taken to ensure that the level of sludge does not drop excessively and is always maintained at substantially half the height of the bottom part of the housing. This effect can be achieved in a simple manner by the provision of inspection windows; the level of sludge can also directly control the discharge quantity.

An essential advantage of the invention in comparison with known settling apparatus is that the sediments are substantially de-watered, so that the subsequent further thickening can be carried out with much less expenditure in respect of power, material and space.

A further advantage of the construction according to the invention is that the apparatus can be kept small in comparison with settling plants of conventional kind, because the retention times for most sludges until clarification in the apparatus according to the invention are only about 5 minutes, and this corresponds to a space-time yield of 12 vol./vol./h. The plant costs are thus reduced.

The efficiency of the apparatus according to the invention is also improved over the prior art as regards the clarifying effect. Tests have shown that sewages which were treated according to the invention still contained at the maximum only 75 mg. per litre filterable solids. This favourable result is due, particularly, to the separate discharge of the floating sludge and the special shape of the housing and the nature and arrangement of the internal fittings.

Apparatus according to the present invention can be used for sewage of the most diverse origin. Thus, communal sewage, tannery and leather works sewage, waste paper treatment plant sewage, metal works pickling plant sewage, colliery sewage, sewage of the cellulose industry and chemical works sewage have been settled with excellent results. This versatility means a reduction of the development and construction costs, and this has a favourable effect on the investment required, particularly in the case of large plants.

As a result of the possibility of continuous operation with automatic control of the feed and discharge, the settling tank according to the invention requires only minor supervision and operating expense.

I claim:

1. A sludge tank for treating sewage and the like to which a flocculation agent has been added, comprising an elongated vertical cylinder forming a tank having a downwardly and inwardly extending conical wall, an enlarged cylindrical wall connected to the upper end of said tank by means of an inwardly and downwardly extending conical wall portion, a cone-shaped discharge member mounted within said last named wall portion having an inlet pipe adapted to be connected to a sewage source, a cylindrical member mounted within the upper end of said cylinder and extending downwardly therein, an outwardly flared upper wall on said cylinder member for receiving sewage from said discharge cone and directing the same downwardly within said cylinder, inverted frusto-conical members mounted in said upper enlarged cylindrical wall portion with their walls in spaced parallel relation to said inwardly and downwardly extending conical wall portion whereby sewage falling by gravity from said discharge cone will pass downwardly to the central portion of said cylinder with the solid components compacting in the lower conical wall of said cylinder and the liquid portion of said sewage being adapted to pass upwardly to the upper end of said enlarged cylindrical portion, and an outlet container at the upper end of said enlarged cylindrical portion for collecting and discharging solid free liquids.

2. A sludge tank for treating sewage and the like to which a flocculation agent has been added, comprising a vertical elongated cylinder forming a tank having a downwardly and inwardly extending bottom wall, an enlarged cylindrical wall connected to the upper end of said tank by means of an inwardly and downwardly extending conical wall portion, a cone-shaped discharge member mounted within said last named conical wall portion having an inlet pipe adapted to be connected to a sewage source, a cylindrical member mounted in concentric relation within the upper end of said first named cylinder and extending downwardly therein a distance substantially equal to one half the height of said cylinder, said cylindrical member being provided on its upper end with an outwardly flared wall portion for receiving sewage from said conical discharge member and directing the same downwardly within said first named cylinder through the central portion thereof where the solid particles settle in the conical lower wall portion and the liquid component passes upwardly between the cylindrical member and said first named cylinder, means in the upper end of said enlarged cylindrical wall to discharge the liquid component, and a series of cone-shaped members mounted in said enlarged cylinder and connecting wall arranged in spaced relation to provide alternately arranged upright and inverted cone surfaces whereby solid particles in said liquid component will collect on said surfaces before the liquid component is discharged from the upper end of said enlarged cylindrical wall.

3. A sludge tank for treating sewage and the like to which a flocculation agent has been added, comprising an elongated vertical cylindrical tank having a conical bottom wall, said tank being provided at its upper end with an enlarged cylindrical portion connected thereto by a downwardly and inwardly extending conical wall portion, a pair of discharge cones mounted in vertically spaced relation in said last named wall portion, a cylindrical member extending downwardly into said cylindrical tank having an upwardly and outwardly flared wall portion disposed beneath the lowermost discharge cone to direct sewage downwardly toward the lower conical bottom wall of said tank and allow the liquid component to flow upwardly toward said enlarged cylindrical portion, a pair of frusto-conical members arranged in inverted relation and spaced from said pair of discharge cones mounted in said enlarged cylindrical portion to provide a series of alternately arranged upright and inverted conical collection surfaces to collect solid particles from said liquid component, a supply pipe connected to at least one of said discharge cones, and a liquid collection trough mounted within the upper enlarged cylindrical portion.

References Cited by the Examiner

UNITED STATES PATENTS 2,922,173   1/1960   Lind et al. _____ 210—521

FOREIGN PATENTS 1,052,360   3/1959   Germany.

REUBEN FRIEDMAN, *Primary Examiner.*

MORRIS O. WOLK, D. M. RIESS, M. E. ROGERS, *Assistant Examiners.*